(12) United States Patent
O'Malley et al.

(10) Patent No.: US 11,595,705 B2
(45) Date of Patent: *Feb. 28, 2023

(54) TRANSMISSION OF APPLICATIONS WITH CONTENT

(71) Applicant: Comcast Cable Communications, LLC, Philadelphia, PA (US)

(72) Inventors: Shawn O'Malley, Glenside, PA (US); Jeremy Zaucha, Downingtown, PA (US); Michael Rosenwald, Pottstown, PA (US); Ruifeng Zhang, Havertown, PA (US)

(73) Assignee: COMCAST CABLE COMMUNICATIONS, LLC, Philadelphia, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/445,507

(22) Filed: Aug. 20, 2021

(65) Prior Publication Data
US 2021/0385512 A1 Dec. 9, 2021

Related U.S. Application Data

(63) Continuation of application No. 16/844,985, filed on Apr. 9, 2020, now Pat. No. 11,134,285, which is a
(Continued)

(51) Int. Cl.
*H04N 21/236* (2011.01)
*H04N 21/24* (2011.01)
(Continued)

(52) U.S. Cl.
CPC ... *H04N 21/23614* (2013.01); *H04N 21/2385* (2013.01); *H04N 21/2402* (2013.01);
(Continued)

(58) Field of Classification Search
None
See application file for complete search history.

(56) References Cited

U.S. PATENT DOCUMENTS 6,742,033 B1 * 5/2004 Smith .................. H04L 69/329
709/224
6,918,135 B1 7/2005 Goffin, II
(Continued)

FOREIGN PATENT DOCUMENTS

CN 102200932 A * 9/2011 ............. G06F 9/467
CN 103312761 A * 9/2013 ............. G06F 15/16
(Continued)

*Primary Examiner* — William J Kim
(74) *Attorney, Agent, or Firm* — BakerHostetler

(57) ABSTRACT

Provided are methods and systems for controlling data such as content and/or application data transmitted to one or more user devices. One method can comprise receiving a request for first content and generating, in response to the request for the first content, a first transport stream comprising the first content and application data relating to a first application. At least a portion of the first transport stream is transmitted to a recipient device. An interruption in the transmission of the first transport stream is detected and a determination is made that only a first portion of the application data has been transmitted to the recipient device. A second transport stream including second content and a second portion of the application data is generated and transmitted.

20 Claims, 7 Drawing Sheets

Related U.S. Application Data continuation of application No. 15/882,466, filed on Jan. 29, 2018, now Pat. No. 10,659,827, which is a continuation of application No. 14/727,000, filed on Jun. 1, 2015, now Pat. No. 9,918,114.

(51) Int. Cl.

| | |
|---|---|
| *H04N 21/2385* | (2011.01) |
| *H04N 21/258* | (2011.01) |
| *H04N 21/81* | (2011.01) |
| *H04N 21/854* | (2011.01) |
| *H04N 21/45* | (2011.01) |
| *H04N 21/434* | (2011.01) |
| *H04N 21/442* | (2011.01) |
| *H04N 21/858* | (2011.01) |
| *H04N 21/478* | (2011.01) |

(52) U.S. Cl.
CPC . *H04N 21/25866* (2013.01); *H04N 21/25883* (2013.01); *H04N 21/25891* (2013.01); *H04N 21/4348* (2013.01); *H04N 21/44204* (2013.01); *H04N 21/44224* (2020.08); *H04N 21/4532* (2013.01); *H04N 21/478* (2013.01); *H04N 21/8126* (2013.01); *H04N 21/8166* (2013.01); *H04N 21/8173* (2013.01); *H04N 21/858* (2013.01); *H04N 21/85406* (2013.01)

(56) References Cited

U.S. PATENT DOCUMENTS

| | | |
|---|---|---|
| 7,756,946 B1 | 7/2010 | Roka et al. |
| 7,831,989 B1 | 11/2010 | Calzone et al. |
| 8,095,642 B1 | 1/2012 | Martin et al. |
| 8,316,363 B2 | 11/2012 | Hocker et al. |
| 2002/0162118 A1 | 10/2002 | Levy et al. |
| 2005/0055426 A1* | 3/2005 | Smith ................ G06F 16/9574 709/219 |
| 2006/0130120 A1 | 6/2006 | Brandyberry et al. |
| 2006/0160622 A1 | 7/2006 | Lee et al. |
| 2008/0092196 A1 | 4/2008 | Koh et al. |
| 2008/0170622 A1 | 7/2008 | Gordon et al. |
| 2009/0300200 A1 | 12/2009 | Jochemsen et al. |
| 2010/0077056 A1* | 3/2010 | Kokal ............. H04N 21/47202 709/217 |
| 2012/0290681 A1 | 11/2012 | Jones et al. |
| 2014/0229971 A1 | 8/2014 | Noland |

FOREIGN PATENT DOCUMENTS

| | | | |
|---|---|---|---|
| JP | 3666796 B2 | * | 6/2005 |
| JP | 4176359 B2 | * | 11/2008 |

\* cited by examiner

TRANSMISSION OF APPLICATIONS WITH CONTENT

CROSS-REFERENCE TO RELATED APPLICATIONS

This application is a continuation of U.S. patent application Ser. No. 16/844,985, filed Apr. 9, 2020, now U.S. Pat. No. 11,134,285, which is a continuation of U.S. patent application Ser. No. 15/882,466, filed Jan. 29, 2018, now U.S. Pat. No. 10,659,827, which is a continuation of U.S. patent application Ser. No. 14/727,000, filed Jun. 1, 2015, now U.S. Pat. No. 9,918,114 each of which are hereby incorporated by reference herein in their entirety.

BACKGROUND

A user device such a digital media player client can receive and render content to a user. Additionally, the user device can request the download of various software applications to be executed locally via the user device. However, the download of such software applications is managed independently from the streaming content and is typically user-driven. For example, a user may access an application site, virtual store, and/or a particular communication channel and may download selected application via the same. However, when a user navigates away from the channel, or the like, the download of the selected application may be interrupted.

This disclosure addresses these and other shortcomings related to data delivery such as content and software applications and the continuity of such data delivery.

SUMMARY

In some aspects, provided are methods and systems for controlling data such as content and/or application data transmitted to one or more user devices. One method can comprise receiving a request for first content and generating, in response to the request for the first content, a first transport stream comprising the first content and application data relating to a first application. At least a portion of the first transport stream can be transmitted to a recipient device such as a device requesting the first content. However, the transmission of the first transport stream may be interrupted, for example, due to the recipient device changing channels or requesting different content, or other conditions such as a change in a power mode of the recipient device. Such an interruption can be detected and a determination can be made that only a first portion of the application data has been transmitted to the recipient device. As such, a determination to transmit the remaining portion of the application data (e.g., a second portion, portion not yet downloaded, etc.) can be made based upon various factors including network conditions, service level, location, usage patterns, usage history, and/or factors that may relate to a likelihood that the end user may interact with the first application if fully downloaded. If it is determined that the remaining portion of the application data should be transmitted, a second transport stream including second content and a second portion of the application data is generated and transmitted.

Additional advantages will be set forth in part in the description which follows or may be learned by practice. The advantages will be realized and attained by means of the elements and combinations particularly pointed out in the appended claims.

BRIEF DESCRIPTION OF THE DRAWINGS

The accompanying drawings, which are incorporated in and constitute a part of this specification, illustrate embodiments and together with the description, serve to explain the principles of the methods and systems.

DETAILED DESCRIPTION

In an aspect, application data such as binary application data can be embedded into a transport stream (e.g., Moving Picture Experts Group standards such as MPEG-2, MPEG-4, a single MPEG-4 video encapsulated in an MPEG-2 transport stream over UDP MCAST, etc.), including content. The transport stream including the content and the application data can be transmitted to a user device such as an IP-enabled device. The transport stream can comprise a multi-program transport stream or a single program transport stream. The user device receiving the transport stream can decode the transport stream to provide playback of the underlying content and to process the embedded application data. For example, as the user device is providing playback of the content (e.g., video rendering), the application data can download in the background. Once the complete application data has completed download, the user device can execute the application via the user device. In the event that the application has not completed downloaded, the content delivery provider may choose to re-insert the application data into the next transport stream (relating to second content such as the next viewed program by the user device). Alternatively, it may be determined to cease download of the application data, where the next transport stream would include content, but exclude the application data. In the event the user device is resource or memory constrained, the user device may remove the downloaded application data, for example, when the content playback has been stopped or terminated.

Figure 1:
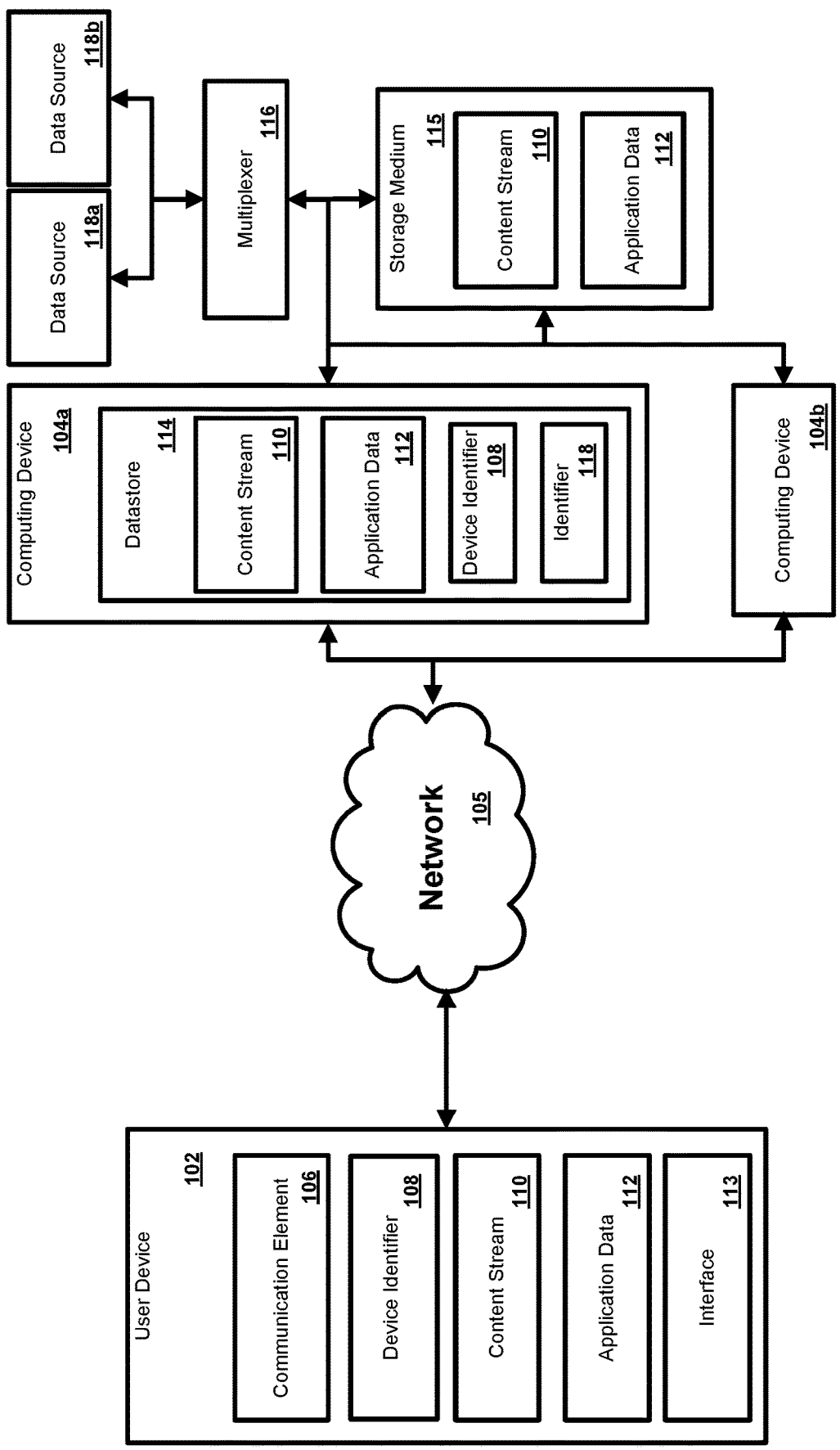
FIG. 1 is a block diagram of an example network.

In one aspect of the disclosure, a system can be configured to provide services such as network-related data services. FIG. 1 illustrates various aspects of an exemplary environment in which the present methods and systems can operate. The present disclosure is relevant to systems and methods for providing services to a user device, for example. Those skilled in the art will appreciate that present methods may be used in various types of networks and systems that employ both digital and analog equipment. One skilled in the art will appreciate that provided herein is a functional description and that the respective functions can be performed by software, hardware, or a combination of software and hardware.

The network and system can comprise a user device 102 in communication with one or more computing devices 104a, 104b such as a server, for example. The computing devices 104a, 104b can be disposed locally or remotely relative to the user device 102. As an example, the user device 102 and the computing devices 104a, 104b can be in communication via a private and/or public network 105 such as the Internet. Other forms of communications can be used such as wired and wireless telecommunication channels, for example.

In an aspect, the user device 102 can be an electronic device such as a computer, a smartphone, a laptop, a tablet, a set top box, a display device, or other device capable of communicating with the computing devices 104a, 104b. As an example, the user device 102 can comprise a communication element 106 for providing an interface to a user to interact with the user device 102 and/or the computing devices 104a, 104b. The communication element 106 can be any interface for presenting information to the user and receiving a user feedback such as an application client or a web browser (e.g., Internet Explorer, Mozilla Firefox, Google Chrome, Safari, or the like). Other software, hardware, and/or interfaces can be used to provide communication between the user and one or more of the user device 102 and the computing devices 104a, 104b. As an example, the communication element 106 can request or query various files from a local source and/or a remote source. As a further example, the communication element 106 can transmit data to a local or remote device such as the computing devices 104a, 104b.

In an aspect, the user device 102 can be associated with a user identifier or device identifier 108. As an example, the device identifier 108 can be any identifier, token, character, string, or the like, for differentiating one user or user device (e.g., user device 102) from another user or user device. In a further aspect, the device identifier 108 can identify a user or user device as belonging to a particular class of users or user devices. As a further example, the device identifier 108 can comprise information relating to the user device such as a manufacturer, a model or type of device, a service provider associated with the user device 102, a state of the user device 102, a locator, and/or a label or classifier. Other information can be represented by the device identifier 108.

In an aspect, the user device 102 can be configured to transmit and/or receive various signals such as a data signals transmitted via the Internet Protocol (IP) or other protocols. As an example, the signals can be transmitted and/or received between the user device 102 and the computing devices 104a, 104b. As an example, the user device 102 can transmit requests for content to a RTSP, MPEG, SDP, or other streaming server such as the computing device 104a. As another example, the user device 102 can be configured to receive a content stream 110 such as a transport stream (e.g., in response to the request for content). The content stream 110 can be an MPEG transport stream such as a multi-program transport stream or a single program transport stream. The content stream 110 can be processed (e.g., decoded) by the user device 102 to provide playback of the content comprised in the content stream 110, for example, via an interface 113 such as a display. As an example, the playback of the content can comprise video playback.

The user device 102 can be configured to receive application data 112 such as binary application data. In an aspect, the application data 112 can comprise at least a portion of data that, when processed, can form an executable application. Such an application can be executed via the user device 102. As an example, the application can relate to the content received by the user device 102. However, the application can be independent of the content. As an example, the application data 112 required to compile the complete application can be divided into portions or data chunks. As another example, the application data 112 or portion thereof can be received by the user device 102 via the transport stream used to deliver the content stream 110. As a further example, the application data 112 can be delivered to the user device 102 via the MPEG Adaptation field, other data tables, or by identifying when null packets exist and replacing null packets with application data as payload data packets.

As an illustrative example, as the user device 102 provides playback of content from the transport stream, the application data 112 can be downloaded. Once the complete set of application data 112 has been received by the user device 102, the user device 102 can process the application data 112 to execute an application, for example via the interface 113. Applications could be downloaded that are related to a broadcast network, program topic, user profile, user demographic, service level, advertiser, geographic location, or usage pattern. An application example would be a cooking application related to cooking program content. Another application example would be an educational children's application related to a children's television network. Another application example would be a sports application related to a sports programming usage pattern. The application can be persistently stored to the user device 102 and/or may be removed (e.g., based on resource availability of the user device 102). In certain aspects, the application can communicate with a server such as an FTP, HTTP, or Restful server (e.g., computing device 104b) for providing a user experience to a user of the user device 102.

In an aspect, one or more of the computing devices 104a, 104b can be a server for communicating with the user device 102. As an example, the computing devices 104a, 104b can communicate with the user device 102 for providing services such as streaming services and/or application-related services. In an aspect, the computing devices 104a, 104b can allow the user device 102 to interact with remote resources such as data, devices, and files. As an example, the computing devices 104a, 104b can be configured as central location (e.g., a headend, or processing facility), which can receive content (e.g., data, input programming) from multiple sources. The computing devices 104a, 104b can combine content from various sources (e.g., data sources 118a, 118b) and can distribute the content to user (e.g., subscriber) locations via a distribution system.

In an aspect, one or more of the computing devices 104a, 104b can manage the communication between the user device 102 and a datastore 114 for sending and receiving data therebetween. As an example, the datastore 114 can store a plurality of data sets (e.g., indexes, content items, data fragments, location identifiers, relational tables, user device identifiers (e.g., identifier 108) or records, network device identifiers (e.g., identifier 118), or other information. As a further example, the user device 102 can request and/or receive (e.g., retrieve) a file from the datastore 114 such as a manifest of one or more location identifiers associated with one or more content items. In an aspect, the datastore 114 can store information for delivery to the user device 102 such as the content stream 110 and/or the application data 112. In another aspect, a storage medium 115 physically and/or logically remote from one or more of the computing devices 104a, 104b can be configured to store information such as the content stream 110 and/or the application data 112.

In an aspect, data from one or more sources (e.g., data sources 118a, 118b) can be multiplexed via multiplexer 116 to generate a transport stream. The multiplexer 116 can comprise an encoder or transcoder for encoding the source data into the transport stream such as a MPEG transport stream. The multiplexer 116 can be any device, system, apparatus, or the like to combine, encode, and/or transcode the source data into a transport stream.

In an aspect, multiplexer 116 can receive video content from the data source 118a and can receive application data from the data source 118b and can combine the application data with the video content into a single transport stream for delivery to the user device 102. As an example, one or more of the data sources 118a, 118b can comprise a content provider for providing one or more of audio content, video content, data, news feeds, sports programming, advertisements, and the like. As another example, one or more of the data sources 118a, 118b can comprise a network data feed transmitting the data stream to users such as subscribers or clients. As a further example, one or more of the data sources 118a, 118b an application server store, a source for binary applications, and/or a firmware source.

As an illustrative example, a user can interact with the user device 102 to request first content such as a video program. While watching the video program via the user device 102, in the background the user device 102 is receiving binary data packets via the transport stream providing the video program. Once the complete data set comprising the application is completely downloaded, the user device 102 can execute the application, for example an interactive game that relates to the video program. The application may be persistently stored such that the application can be used after the video program has stopped playback.

Figure 2:
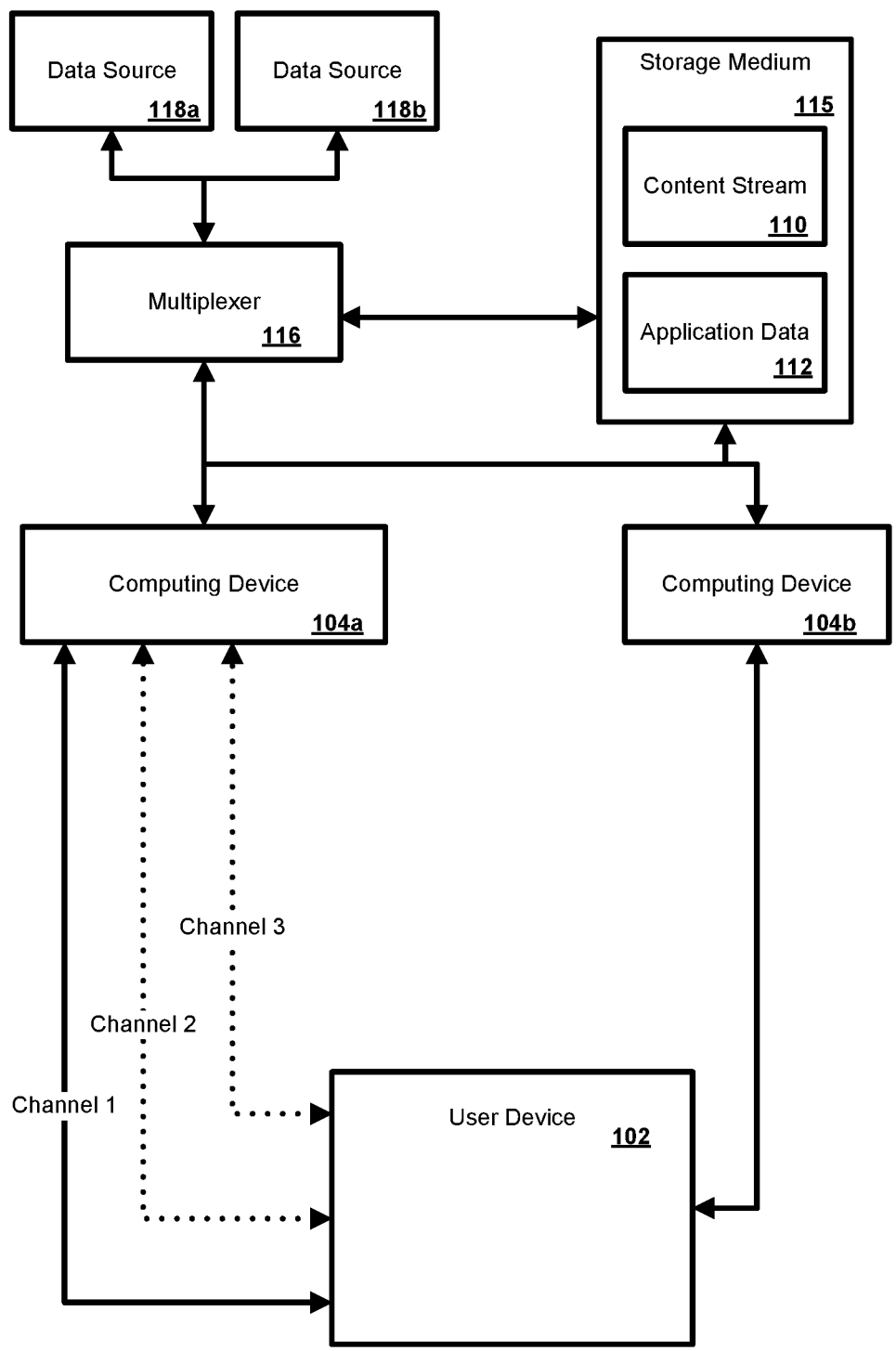
FIG. 2 is a block diagram of an example system architecture.

As illustrated in FIG. 2, the computing device 104a can be configured as a streaming server such as and RTSP, MPEG, or SDP server, for example. As such, the user device 102 can transmit requests for particular content to be accessed by or delivered from the computing device 104a. For illustration, the delivery of different content streams is shown as distinct channels between the computing device 104a and user device 102. However, the channels can be representative in nature and can comprise a single communication channel with different content being delivered via the single channel. As shown, the user device 102 may request first content, as represented by channel 1. As such, the requested first content can be combined with at least a portion of the application data 112 and transmitted to the user device 102 via a transport stream. The transport stream can comprise a multi-program transport stream or a single program transport stream. The user device 102 receiving the transport stream can decode the transport stream to provide playback of the underlying first content and to process the embedded application data. For example, as the user device 102 is providing playback of the first content (e.g., video rendering), the application data can download in the background. Once the complete application data has completed download, the user device 102 can execute the application via the user device 102, which can intercommunicate with the computing device 104b configured as an application server.

Figure 3:
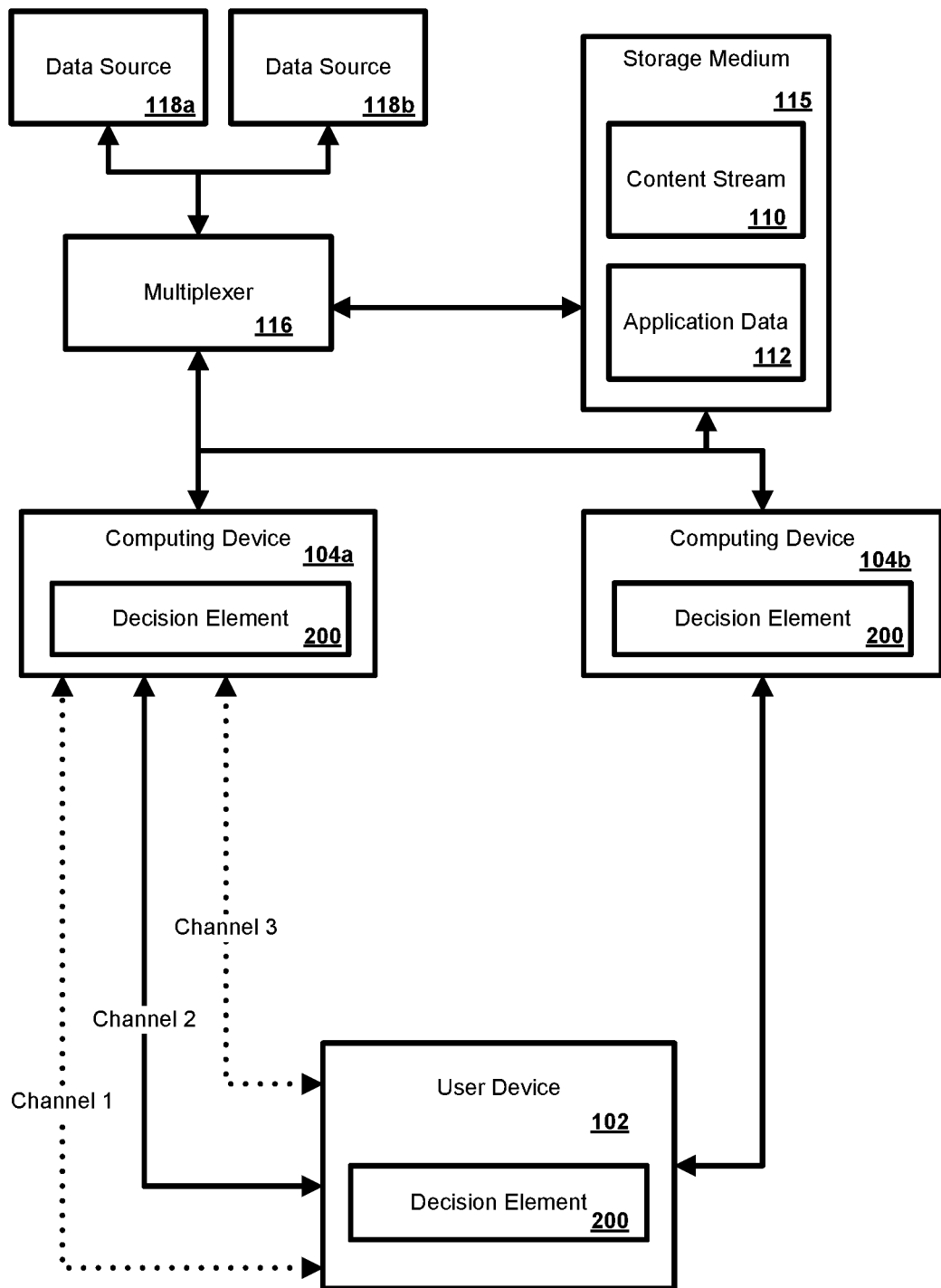
FIG. 3 is a block diagram of an example system architecture.

While the user device 102 is tuned to channel 1 (FIG. 2), the user device 102 can make a request for second content, for example, as represented by channel 2 (FIG. 3). Such a request can include tuning or changing the channel. Alternatively, a user may simply terminate the access to content via channel 1, for example, by turning off the user device 102, or interrupting transmission/reception of content such as by stopping download, playback, recording and the like.

In response to the request for second content or other interruption to receiving the first content, the computing device 104a can transmit a transport stream including the requested second content. In the event that the application data 112 has not completed downloading before the request for the second content is processed, the content delivery provider, or another entity such as an intervening provider, service, administrator, and the like, may choose to insert the remaining portion of the application data 112 into the next transport stream (relating to the requested second content such as the next viewed program by the user device 102).

In an aspect, a decision element 200 can be configured to determine whether the remaining portion (e.g., not yet downloaded portion) of the application data 112 should be transmitted to the user device 102. Such a decision can be executed at any time, for example, when the user device 102 is powered off, when a new content request is transmitted/received, when the rendered content program has stopped or is interrupted, when a time period has passed, and the like. The decision to continue downloading the application data 112 may be based on predictive analysis. For example, the predictive analysis can include a determination whether the user is likely to return to the base content in the future, or have other uses for the application. The decision to continue downloading the application data 112 can be based on a determination that the user is likely to return to the first content, for example, via channel 1. The decision to continue downloading the application data 112 can be based on a determination whether the application to which the application data 112 relates, relates to other, different content the user is likely to watch such as the second content. The decision to continue downloading the application data 112 can be based upon at least a determination of whether a user will subsequently interact with the application, if fully downloaded. Such determination can be based on a determination of user interest, historical usage pattern, user habits/preferences, and the like.

The logic determining the continued downloading of application data 112 can be based upon information relating to a network condition, program/content topic, user profile, user demographic, service level, advertiser, geographic location, available bandwidth, or usage pattern. Determining the continued downloading of application data 112 can be based upon at least a determination of whether a user will subsequently request transmission of the first transport stream, a determination of whether a user will subsequently interact with the first application, and/or at least a determination of user interest in the application relating to the application data 112.

Partial application data downloads can be saved for completion or removed from the end user device. End users can be prompted for input on whether to continue an interrupted download, whether to execute a completed download, whether to begin a download, or whether to delete a partial or complete application download. Application download priority can be employed to determine which application should download if multiple application download options exist. Default parameters can be set that define what application download rules applied to the end user device. As an example, the application data can be multicast to an entire population or unicast to a single end user; application data can be inserted in transport streams delivered to many users or a single user. The application data insertion can continue as the user subsequently changes video content selections, requests, and/or tuning.

Continued delivery of the application may be accomplished by packaging the application with different content—e.g., the content being delivered on the new channel to which the user navigated. Continued delivery of the application content may occur with content not related to the application. If the decision element 200 determines to cease download of the application data, the next transport stream would include content, but would exclude the application data. In the event the user device 102 is resource or memory constrained, the user device may remove the downloaded application data, for example, when the content playback has been stopped or terminated.

Figure 4:
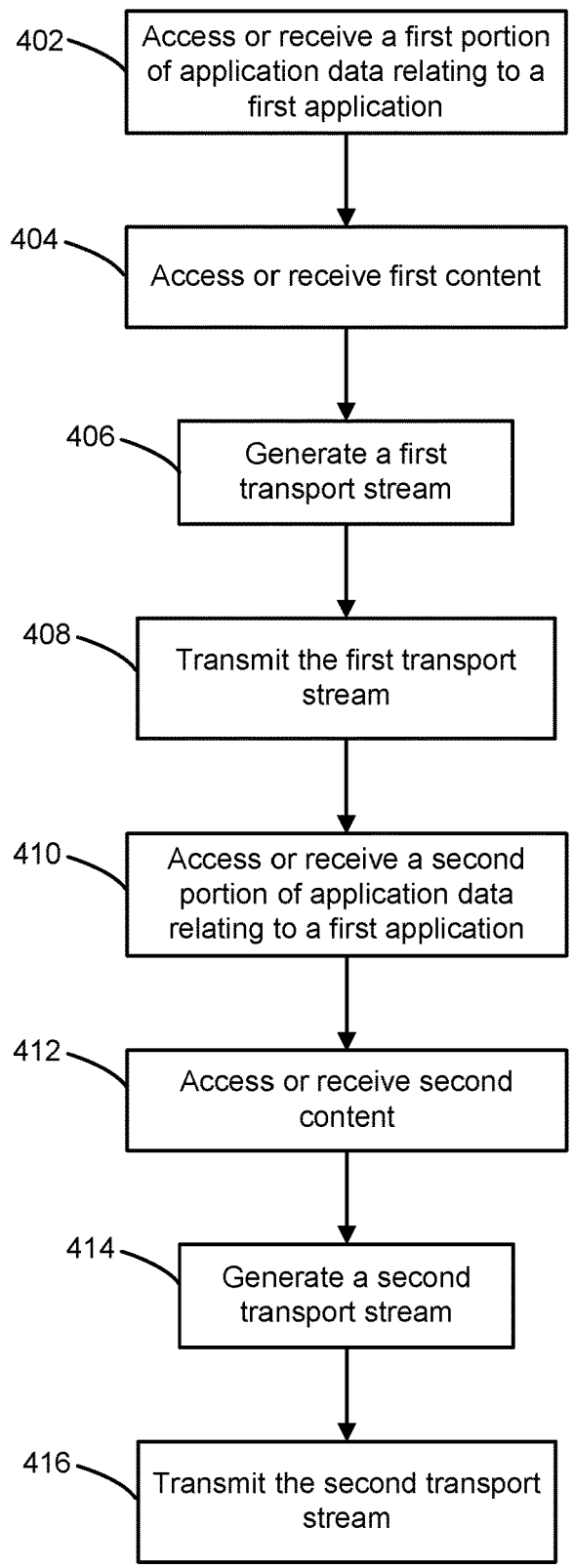
FIG. 4 is a flow chart of an example method.

FIG. 4 illustrates an example method. In step 402, a first portion of application data can be accessed or received, for example, via a computing device (e.g., computing device 104a,104b, multiplexer 116 (FIG. 1)). In an aspect, the first portion of the application data can relate to a first application configured to be executed via a user device. As an example, the first portion of the application data comprises binary application data. In step 404, first content can be accessed or received, for example, via a computing device (e.g., computing device 104a,104b, multiplexer 116 (FIG. 1)). As an example, the first content can comprise video. As another example, the first application contextually relates to the first content. As a further example, a device such as multiplexer 116 (FIG. 1) can receive video content from a data source and can receive application data from the same or a different data source and can combine the application data with the video content into a single transport stream for delivery to a recipient device such as the user device 102 (FIG. 1), such as shown in step 406.

In step 406, a first transport stream can be generated (e.g., multiplexed, encoded). Generation of the first transport stream can be accomplished as a dynamic event wherein a portion of the transport stream are encoded and transmitted before other portions of the transport stream are encoded. In an aspect, the first transport stream can include the first portion of the application data and the first content. As an example, the first transport stream can comprise a multi-program transport stream or a single program transport stream. As another example, the first transport stream can comprise a moving pictures experts group (MPEG) transport stream. As a further example, the first transport stream can be generated in response to receiving a request for the first content. In step 408, the first transport stream can be transmitted, for example to user device such as a source of a request for the first content. Transmission and/or recipient of the first transport steam can comprise transmission and/or receipt of any portion of the first transport stream.

In step 410, a second portion of the application data can be accessed or received, for example, via a computing device (e.g., computing device 104a,104b, multiplexer 116 (FIG. 1)). In an aspect, the second portion of the application data can relate to the first application configured to be executed via a user device. As an example, the second portion of the application data can be a portion of the first application that has not yet been downloaded to the recipient user device. As another example, the second portion of the application data comprises binary application data. In step 412, second content can be accessed or received, for example, via a computing device (e.g., computing device 104a,104b, multiplexer 116 (FIG. 1)). As an example, the second content can comprise video. As another example, the second application contextually relates to the first content and/or the second content.

In step 414, a second transport stream can be generated (e.g., multiplexed, encoded). In an aspect, the second transport stream can include the second portion of the application data and the second content. As an example, the second transport stream can comprise a multi-program transport stream or a single program transport stream. As another example, the second transport stream can comprise a MPEG transport stream. As a further example, the second transport stream can be generated in response to receiving a request for the second content. In step 416, the second transport stream can be transmitted, for example to user device such as a source of a request for the second content.

Figure 5:
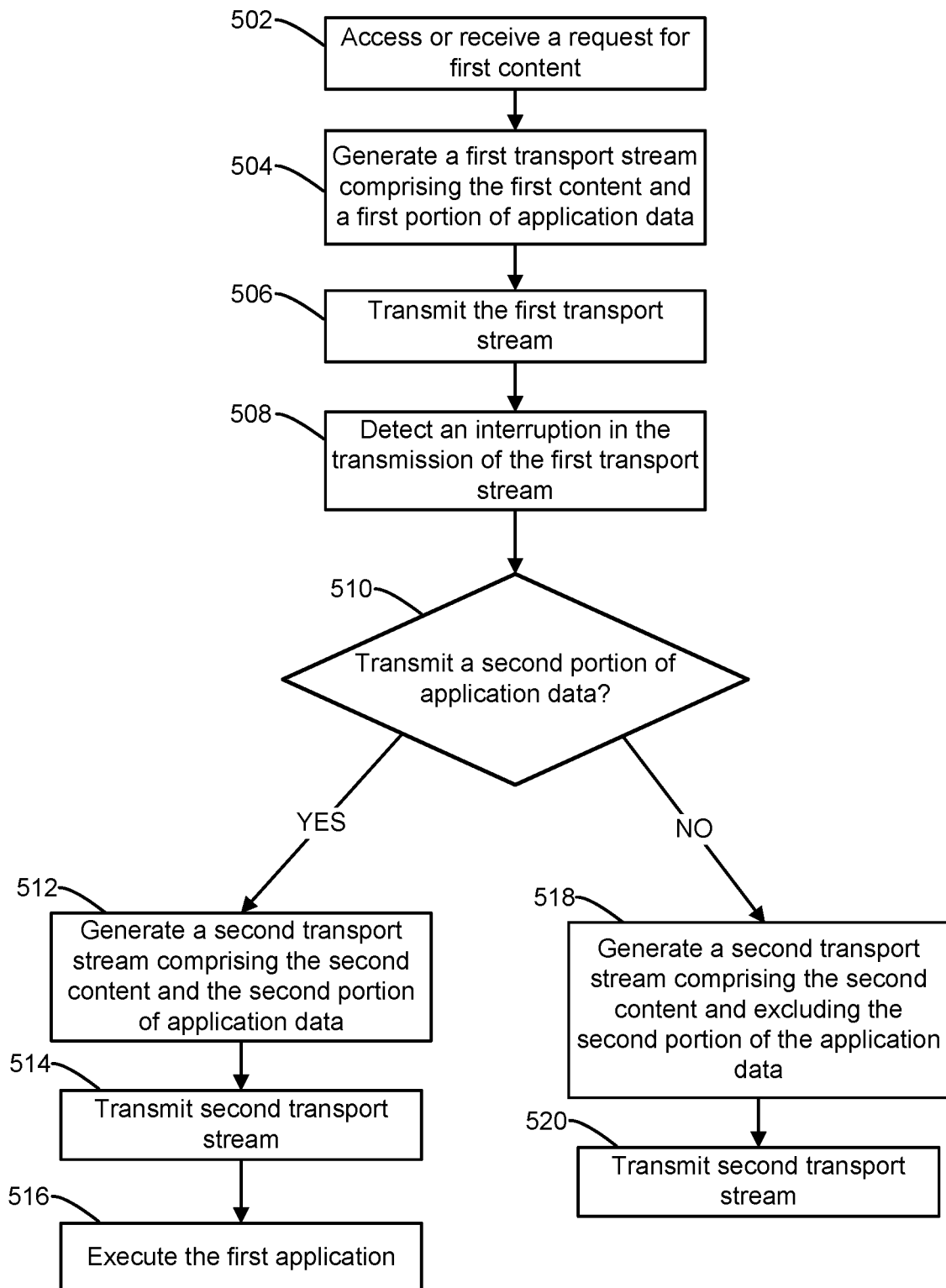
FIG. 5 is a flow chart of an example method.

FIG. 5 illustrates an example method. In step 502, a request for first content can be received or accessed, for example, via a computing device (e.g., computing device 104a,104b (FIG. 1)). In step 504, a first transport stream can be generated (e.g., multiplexed, encoded). In an aspect, the first transport stream can include a first portion of the application data and the first content. As an example, the first transport stream can comprise a multi-program transport stream or a single program transport stream. As another example, the first transport stream can comprise a moving pictures experts group (MPEG) transport stream. As a further example, the first transport stream can be generated in response to receiving a request for the first content. In step 506, the first transport stream can be transmitted, for example to user device such as a source of the request for the first content.

In step 508, an interruption in the transmission of the first transport stream can be detected, for example, via a computing device (e.g., computing device 104a,104b (FIG. 1)). Detecting an interruption in the transmission of the first transport stream can comprise receiving a request for the second content, detecting a channel change, and detecting a power mode change of the recipient device such as turning of the device, and the like.

When the transmission of the first transport stream is interrupted, the entire application data may not have been transmitted/downloaded. For example, a determination can be made (e.g., via user device 102 and/or computing device 104a,104b (FIG. 1)) that only the first portion of the application data has been successfully downloaded. As such, a determination can me made whether the second portion of the application data should be transmitted. The logic determining the continued downloading of application data can be based upon information relating to network conditions, program/content topic, user profile, user demographic, service level, advertiser, geographic location, available bandwidth, or usage pattern/behavior. Partial application data downloads can be saved for completion or removed from the end user device. End users can be prompted for input on whether to continue an interrupted download, whether to execute a completed download, whether to begin a download, or whether to delete a partial or complete application download. Application download priority can be employed to determine which application should download if multiple application download options exist. Default parameters can be set that define what application download rules applied to the end user device. As an example, the application data can be multicast to an entire population or unicast to a single end user; application data can be inserted in transport streams delivered to many users or a single user. The application data insertion can continue as the user subsequently changes video content selections, requests, and/or tuning.

In step 512, a second transport stream can be generated (e.g., multiplexed, encoded). In an aspect, the second transport stream can include the second portion of the application data and the second content based on the determination of step 510. As an example, the second transport stream can comprise a multi-program transport stream or a single program transport stream. As another example, the second transport stream can comprise a MPEG transport stream. As a further example, the second transport stream can be generated in response to receiving a request for the second content. In step 514, the second transport stream can be transmitted, for example to user device such as a source of a request for the second content.

In step 516, the downloaded first application can be executed. As an example, if the entire application data required to execute the first application has been downloaded, the first application can be executed. If additional portions of the application data are required, the remaining portion can be downloaded and the first application can then be executed.

If it is determined that the remaining application data (e.g., the second portion of the application data) should not be downloaded, a second transport stream can be generated (e.g., multiplexed, encoded) to include the second content and can exclude the second portion of the application data, at step 518, based on the determination of step 510. As an example, the second transport stream can comprise a multi-program transport stream or a single program transport stream. As another example, the second transport stream can comprise a MPEG transport stream. As a further example, the second transport stream can be generated in response to receiving a request for the second content. In step 520, the second transport stream can be transmitted, for example to user device such as a source of a request for the second content.

Figure 6:
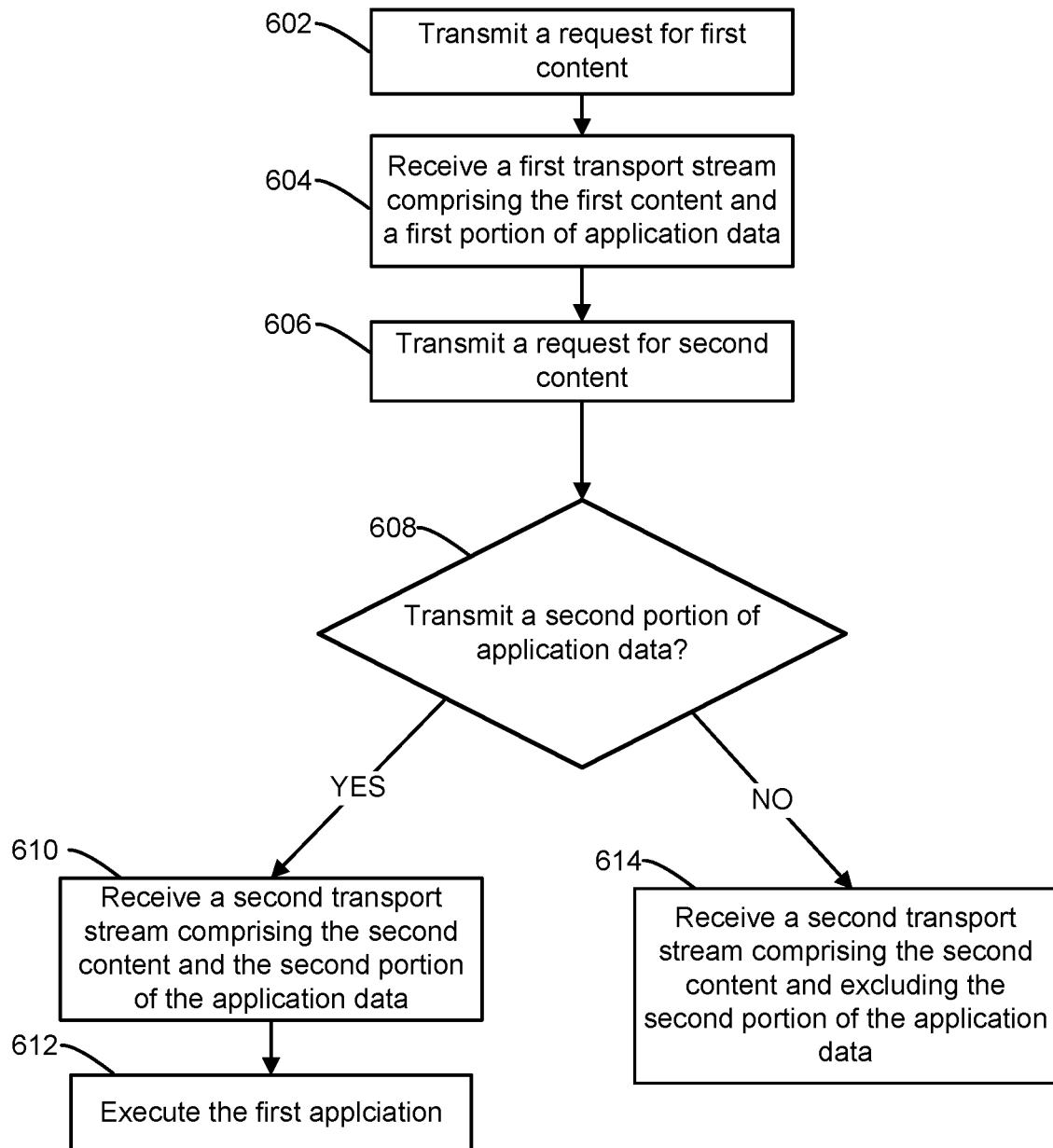
FIG. 6 is a flow chart of an example method.

FIG. 6 illustrates an exemplary method. In step 602, a request for first content can be transmitted, for example by a user device (e.g., user device 102 (FIG. 1)). In step 604, a first transport stream can be received, for example, by the user device. In an aspect, the first transport stream can include a first portion of the application data and the first content. As an example, the first transport stream can comprise a multi-program transport stream or a single program transport stream. As another example, the first transport stream can comprise a moving pictures experts group (MPEG) transport stream. As a further example, the first transport stream can be generated in response to receiving a request for the first content.

In step 606, a request for second content can be transmitted, for example, by the user device. In step 608, a determination can me made whether the second portion of the application data should be transmitted. Such a determination can be made locally to the user device or via a physical or logical element remote from the user device. In step 610, a second transport stream can be received and can include the second portion of the application data and the second content based on the determination of step 608. As an example, the second transport stream can comprise a multi-program transport stream or a single program transport stream. As another example, the second transport stream can comprise a MPEG transport stream. As a further example, the second transport stream can be generated in response to receiving a request for the second content. In step 612, the downloaded first application can be executed.

In step 614, a second transport stream can be received including the second content and excluding the second portion of the application data based on the determination of step 610. As an example, the second transport stream can comprise a multi-program transport stream or a single program transport stream. As another example, the second transport stream can comprise a MPEG transport stream. As a further example, the second transport stream can be generated in response to receiving a request for the second content.

Figure 7:
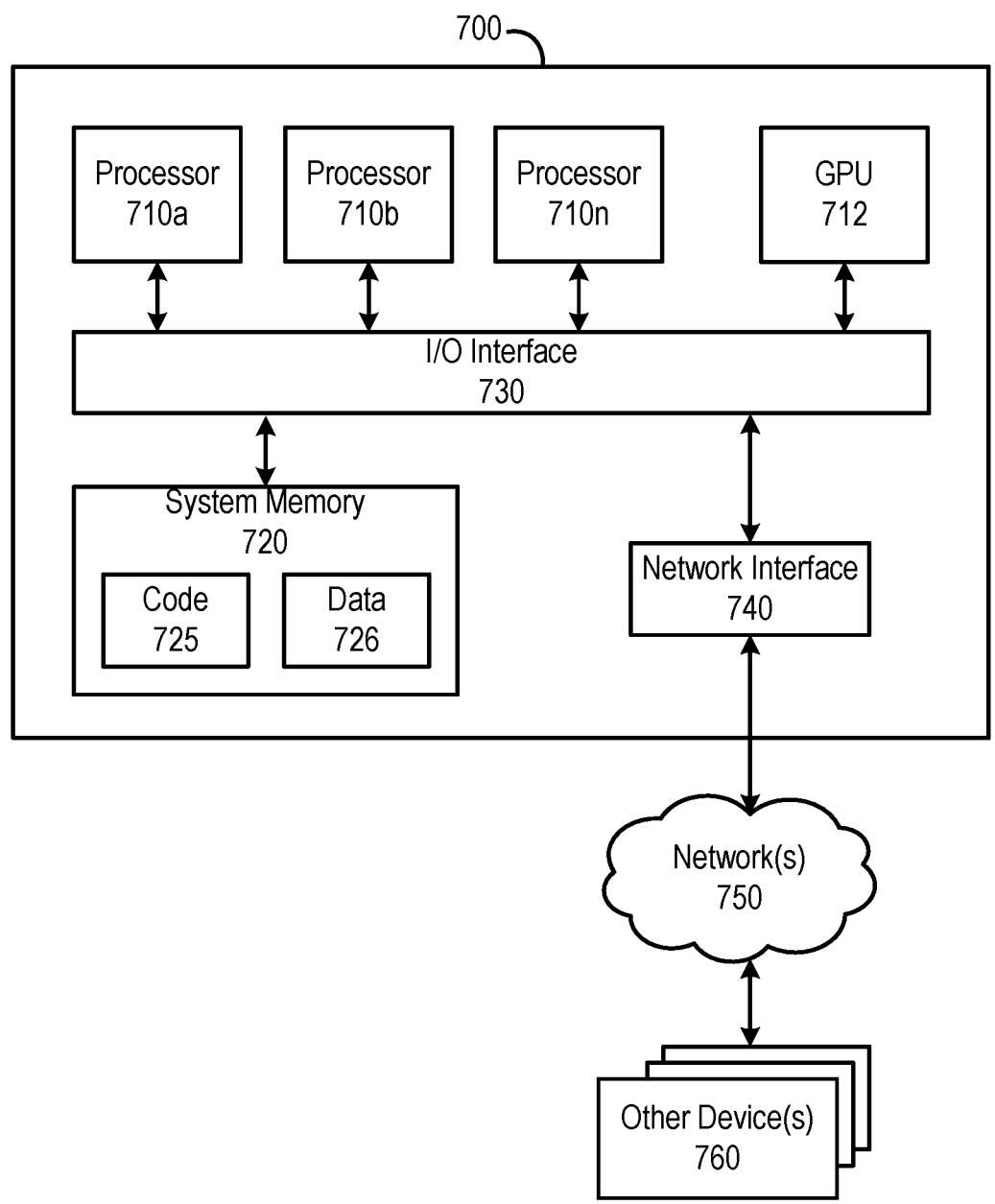
FIG. 7 is a block diagram of an example computing system.

FIG. 7 depicts a general-purpose computer system that includes or is configured to access one or more computer-accessible media. In the illustrated embodiment, a computing device 700 may include one or more processors 710a, 710b, and/or 710n (which may be referred herein singularly as the processor 710 or in the plural as the processors 710) coupled to a system memory 720 via an input/output (I/O) interface 730. The computing device 700 may further include a network interface 740 coupled to an I/O interface 730.

In various embodiments, the computing device 700 may be a uniprocessor system including one processor 710 or a multiprocessor system including several processors 710 (e.g., two, four, eight, or another suitable number). The processors 710 may be any suitable processors capable of executing instructions. For example, in various embodiments, the processor(s) 710 may be general-purpose or embedded processors implementing any of a variety of instruction set architectures (ISAs), such as the x86, PowerPC, SPARC, or MIPS ISAs, or any other suitable ISA. In multiprocessor systems, each of the processors 710 may commonly, but not necessarily, implement the same ISA.

In some embodiments, a graphics processing unit ("GPU") 712 may participate in providing graphics rendering and/or physics processing capabilities. A GPU may, for example, comprise a highly parallelized processor architecture specialized for graphical computations. In some embodiments, the processors 710 and the GPU 712 may be implemented as one or more of the same type of device.

The system memory 720 may be configured to store instructions and data accessible by the processor(s) 710. In various embodiments, the system memory 720 may be implemented using any suitable memory technology, such as static random access memory ("SRAM"), synchronous dynamic RAM ("SDRAM"), nonvolatile/Flash®-type memory, or any other type of memory. In the illustrated embodiment, program instructions and data implementing one or more desired functions, such as those methods, techniques and data described above, are shown stored within the system memory 720 as code 725 and data 726.

In one embodiment, the I/O interface 730 may be configured to coordinate I/O traffic between the processor(s) 710, the system memory 720 and any peripherals in the device, including a network interface 740 or other peripheral interfaces. In some embodiments, the I/O interface 730 may perform any necessary protocol, timing or other data transformations to convert data signals from one component (e.g., the system memory 720) into a format suitable for use by another component (e.g., the processor 710). In some embodiments, the I/O interface 730 may include support for devices attached through various types of peripheral buses, such as a variant of the Peripheral Component Interconnect (PCI) bus standard or the Universal Serial Bus (USB) standard, for example. In some embodiments, the function of the I/O interface 730 may be split into two or more separate components, such as a north bridge and a south bridge, for example. Also, in some embodiments some or all of the functionality of the I/O interface 730, such as an interface to the system memory 720, may be incorporated directly into the processor 710.

The network interface 740 may be configured to allow data to be exchanged between the computing device 700 and other device or devices 760 attached to a network or networks 750, such as other computer systems or devices, for example. In various embodiments, the network interface 740 may support communication via any suitable wired or wireless general data networks, such as types of Ethernet networks, for example. Additionally, the network interface 740 may support communication via telecommunications/telephony networks, such as analog voice networks or digital fiber communications networks, via storage area networks, such as Fibre Channel SANs (storage area networks), or via any other suitable type of network and/or protocol.

In some embodiments, the system memory 720 may be one embodiment of a computer-accessible medium configured to store program instructions and data as described above for implementing embodiments of the corresponding methods and apparatus. However, in other embodiments, program instructions and/or data may be received, sent, or stored upon different types of computer-accessible media. Generally speaking, a computer-accessible medium may include non-transitory storage media or memory media, such as magnetic or optical media, e.g., disk or DVD/CD coupled to computing device the 700 via the I/O interface 730. A non-transitory computer-accessible storage medium may also include any volatile or non-volatile media, such as RAM (e.g., SDRAM, DDR SDRAM, RDRAM, SRAM, etc.), ROM, etc., that may be included in some embodiments of the computing device 700 as the system memory 720 or another type of memory. Further, a computer-accessible medium may include transmission media or signals, such as electrical, electromagnetic or digital signals, conveyed via a communication medium, such as a network and/or a wireless link, such as those that may be implemented via the network interface 740. Portions or all of multiple computing devices, such as those illustrated in FIG. 7, may be used to implement the described functionality in various embodiments; for example, software components running on a variety of different devices and servers may collaborate to provide the functionality. In some embodiments, portions of the described functionality may be implemented using storage devices, network devices or special-purpose computer systems, in addition to or instead of being implemented using general-purpose computer systems. The term "computing device," as used herein, refers to at least all these types of devices and is not limited to these types of devices.

It should also be appreciated that the systems in the figures are merely illustrative and that other implementations might be used. Additionally, it should be appreciated that the functionality disclosed herein might be implemented in software, hardware, or a combination of software and hardware. Other implementations should be apparent to those skilled in the art. It should also be appreciated that a server, gateway, or other computing node may include any combination of hardware or software that may interact and perform the described types of functionality, including without limitation desktop or other computers, database servers, network storage devices and other network devices, PDAs, tablets, cellphones, wireless phones, pagers, electronic organizers, Internet appliances, television-based systems (e.g., using set top boxes and/or personal/digital video recorders), and various other consumer products that include appropriate communication capabilities. In addition, the functionality provided by the illustrated modules may in some aspects be combined in fewer modules or distributed in additional modules. Similarly, in some aspects the functionality of some of the illustrated modules may not be provided and/or other additional functionality may be available.

Each of the operations, processes, methods, and algorithms described in the preceding sections may be embodied in, and fully or partially automated by, code modules executed by at least one computer or computer processors. The code modules may be stored on any type of non-transitory computer-readable medium or computer storage device, such as hard drives, solid state memory, optical disc, and/or the like. The processes and algorithms may be implemented partially or wholly in application-specific circuitry. The results of the disclosed processes and process steps may be stored, persistently or otherwise, in any type of non-transitory computer storage such as, e.g., volatile or non-volatile storage.

The various features and processes described above may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto may be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example aspects. The example systems and components described herein may be configured differently than described. For example, elements may be added to, removed from, or rearranged compared to the disclosed example aspects.

It will also be appreciated that various items are illustrated as being stored in memory or on storage while being used, and that these items or portions of thereof may be transferred between memory and other storage devices for purposes of memory management and data integrity. Alternatively, in other aspects some or all of the software modules and/or systems may execute in memory on another device and communicate with the illustrated computing systems via inter-computer communication. Furthermore, in some aspects, some or all of the systems and/or modules may be implemented or provided in other ways, such as at least partially in firmware and/or hardware, including, but not limited to, at least one application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network, or a portable media article to be read by an appropriate drive or via an appropriate connection. The systems, modules, and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other aspects. Accordingly, the present disclosure may be practiced with other computer system configurations.

Conditional language used herein, such as, among others, "may," "could," "might," "may," "e.g.," and the like, unless specifically stated otherwise, or otherwise understood within the context as used, is generally intended to convey that certain aspects include, while other aspects do not include, certain features, elements, and/or steps. Thus, such conditional language is not generally intended to imply that features, elements, and/or steps are in any way required for at least one aspects or that at least one aspects necessarily include logic for deciding, with or without author input or prompting, whether these features, elements, and/or steps are included or are to be performed in any particular aspect. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

While certain example aspects have been described, these aspects have been presented by way of example only, and are not intended to limit the scope of aspects disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions, and changes in the form of the methods and systems described herein may be made without departing from the spirit of aspects disclosed herein. The accompanying claims and their equivalents are intended to cover such forms or modifications as would fall within the scope and spirit of certain aspects disclosed herein.

The preceding detailed description is merely exemplary in nature and is not intended to limit the disclosure or the application and uses of the disclosure. The described aspects are not limited to use in conjunction with a particular type of machine. Hence, although the present disclosure, for convenience of explanation, depicts and describes particular machine, it will be appreciated that the assembly and electronic system in accordance with this disclosure may be implemented in various other configurations and may be used in other types of machines. Furthermore, there is no intention to be bound by any theory presented in the preceding background or detailed description. It is also understood that the illustrations may include exaggerated dimensions to better illustrate the referenced items shown, and are not consider limiting unless expressly stated as such.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

The disclosure may include communication channels that may be any type of wired or wireless electronic communications network, such as, e.g., a wired/wireless local area network (LAN), a wired/wireless personal area network (PAN), a wired/wireless home area network (HAN), a wired/wireless wide area network (WAN), a campus network, a metropolitan network, an enterprise private network, a virtual private network (VPN), an internetwork, a backbone network (BBN), a global area network (GAN), the Internet, an intranet, an extranet, an overlay network, a cellular telephone network, a Personal Communications Service (PCS), using known protocols such as the Global System for Mobile Communications (GSM), CDMA (Code-Division Multiple Access), Long Term Evolution (LTE), W-CDMA (Wideband Code-Division Multiple Access), Wireless Fidelity (Wi-Fi), Bluetooth, and/or the like, and/or a combination of two or more thereof.

Additionally, the various aspects of the disclosure may be implemented in a non-generic computer implementation. Moreover, the various aspects of the disclosure set forth herein improve the functioning of the system as is apparent from the disclosure hereof. Furthermore, the various aspects of the disclosure involve computer hardware that it specifically programmed to solve the complex problem addressed by the disclosure. Accordingly, the various aspects of the disclosure improve the functioning of the system overall in its specific implementation to perform the process set forth by the disclosure and as defined by the claims.

Recitation of ranges of values herein are merely intended to serve as a shorthand method of referring individually to each separate value falling within the range, unless otherwise indicated herein, and each separate value is incorporated into the specification as if it were individually recited herein. All methods described herein may be performed in any suitable order unless otherwise indicated herein or otherwise clearly contradicted by context.

The methods and systems can employ artificial intelligence techniques such as machine learning and iterative learning. Examples of such techniques include, but are not limited to, expert systems, case based reasoning, Bayesian networks, behavior based AI, neural networks, fuzzy systems, evolutionary computation (e.g. genetic algorithms), swarm intelligence (e.g. ant algorithms), and hybrid intelligent systems (e.g. expert inference rules generated through a neural network or production rules from statistical learning).

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

It is to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods and comprise the disclosed systems. These and other components are disclosed herein, and it is understood that when combinations, subsets, interactions, groups, etc. of these components are disclosed that while specific reference of each various individual and collective combination and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

The present methods and systems may be understood more readily by reference to the following detailed description of preferred embodiments and the examples included therein and to the Figures and their previous and following description.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

It will be apparent to those skilled in the art that various modifications and variations can be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

The invention claimed is:

1. A method comprising:
sending via a transport stream, and to a user device, application data associated with an application;
detecting an interruption of the sending the transport stream;
determining that only a first portion of the application data has been sent prior to the interruption of the sending the transport stream;
determining, based on a usage pattern of the user device, to send a second portion of the application data to the user device; and
sending, to the user device, the second portion of the application data.

2. The method of claim 1, wherein sending the first portion of the application data comprises sending the first portion of the application data during a first communication session, and wherein sending the second portion of the application data comprises sending the second portion of the application data during a second communication session.

3. The method of claim 1, wherein the transport stream comprises content.

4. The method of claim 3, wherein the content is associated with at least the first portion of the application data.

5. The method of claim 3, wherein the content is independent of at least the first portion of the application data.

6. The method of claim 1, wherein the usage pattern comprises a historical usage of one or more applications associated with the user device.

7. The method of claim 1, wherein the determining to send the second portion of the application data is further based at least in part on one or more of network conditions, a service level, a location of the user device, a user demographic associated with the user device, or a combination thereof.

8. A method comprising:
sending via a transport stream, and to a user device, application data associated with an application;
detecting an interruption of the sending the transport stream;
determining that only a first portion of the application data has been sent prior to the interruption of the sending the transport stream;

determining, based on a usage pattern of a user associated with the user device, to send a second portion of the application data to the user device; and sending, to the user device, the second portion of the application data.

9. The method of claim 8, wherein sending the first portion of the application data comprises sending the first portion of the application data during a first communication session, and wherein sending the second portion of the application data comprises sending the second portion of the application data during a second communication session.

10. The method of claim 8, wherein the transport stream comprises content.

11. The method of claim 10, wherein the content is associated with at least the first portion of the application data.

12. The method of claim 10, wherein the content is independent of at least the first portion of the application data.

13. The method of claim 8, wherein the usage pattern comprises a historical usage of one or more applications associated with the user.

14. The method of claim 8, wherein the determining to send the second portion of the application data is further based at least in part on one or more of network conditions, a service level, a location of the user device, a user demographic associated with the user, or a combination thereof.

15. A system comprising:
a user device; and
a computing device configured to:
send via a transport stream, and to the user device, application data associated with an application;
detect an interruption of the sending the transport stream;
determine that only a first portion of the application data has been sent prior to the interruption of the sending the transport stream;
determine, based on a usage pattern of the user device, to send a second portion of the application data to the user device; and
send, to the user device, the second portion of the application data.

16. The system of claim 15, wherein the computing device sends the first portion of the application data during a first communication session, and wherein the computing device sends the second portion of the application data during a second communication session.

17. The system of claim 15, wherein the transport stream comprises content.

18. The system of claim 17, wherein the content is associated with at least the first portion of the application data.

19. The system of claim 17, wherein the content is independent of at least the first portion of the application data.

20. The system of claim 15, wherein the computing device determines the usage pattern of the user device based at least in part on a historical usage of one or more applications associated with the user device.

* * * * *